INVENTORS
ERWIN J. H. BENTZ
PHILIP J. COSTA
CLYDE E. FULTON
BY
ATTORNEYS

United States Patent Office 3,359,385
Patented Dec. 19, 1967

3,359,385
FLOW SENSING DEVICE
Erwin J. H. Bentz, Washington, Philip J. Costa, Chillicothe, and Clyde E. Fulton, Pekin, Ill., assignors to Caterpillar Tractor Co., Peoria, Ill., a corporation of California
Filed June 9, 1966, Ser. No. 556,469
2 Claims. (Cl. 200—81.9)

ABSTRACT OF THE DISCLOSURE

A permanent magnet is attached to a thin flexible leaf spring which hangs from the upper portion of a housing, the lower portion of which contains a glass encapsulated reed switch magnetically actuated by the force of attraction from the permanent magnet when the leaf spring is urged by fluid into working proximity with the switch. The leaf spring and part of the housing are in the flow stream of a fluid conduit. A predetermined rate of fluid flow is required before the magnet is moved within working proximity of the switch to actuate it.

---

The present invention relates to flow sensing means and more particularly to a flow sensing device capable of sensing a relatively weak order of fluid flow.

No quarter of industry has experienced the need for a dependable and sensitive flow sensing device more than the engine manufacturer. In the economical operation of today's powerful automobile, tractor and truck engines, it is essential that the engine's coolant be constantly circulated through its cooling system. A cracked engine block often results from a breakdown or obstruction in the circulation system causing the coolant to stop circulating and to quickly rise to an unacceptably high temperature. While there is no universally acceptable rate of fluid flow for all engines, it has been found from experiments with certain engines that a rate of flow less than two feet per second in portions of their circulation system, will not cool the engine sufficiently to avoid cracking of the engine block.

To avert this danger, a flow sensing device capable of sensing and responding to delicate levels of fluid flow is inserted in the conduit leading from the water pump. Absence of flow or a rate of flow below critical is thus quickly detected by an electrical system, such as a system of indicator lights, electrically associated with the device. Such indicator lights may be conveniently located in the operator's compartment of a vehicle powered by the engine.

While the prior art teaches the use of flow sensing devices, they suffer from several disadvantages. One serious disadvantage in the prior art devices is their relative inability to detect and respond to low rates of flow; another disadvantage is the tendency of their pivoted vanes to corrode and to stick. Some are too cumbersome and largely restrict the fluid flow in the conduits, others are highly susceptible to wear and fatigue from vibrations. Still others become inoperative as the result of contaminants in the fluid which tend to clog the pivot points of the fluid actuated vanes.

Accordingly, it is an object of the present invention to provide a flow sensing device which is dependable and yet inexpensive to manufacture.

It is another object of the present invention to provide a flow sensing device which is sufficiently sensitive to detect relatively weak rates of fluid flow.

It is still another object of the present invention to provide a flow sensing device wherein the sensor is flexibly mounted and free from pivotally connected parts, thus ensuring long life.

It is still another object of this invention to provide a flow sensing device wherein the sensor is flexibly mounted to the housing at a point such that a reed switch can be opened or closed with a minimum of flexure of the sensor to ensure long life free from destruction by metal fatigue.

Still further and more specific objects and advantages of the present invention will become apparent from the following description taken in connection with the accompanying drawing, wherein.

Figure 1:
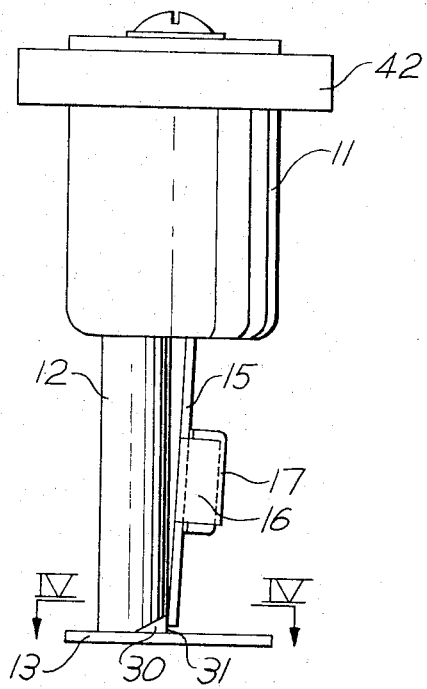
FIG. 1 is a side elevation of one embodiment of the flow sensing device of the present invention.
Figure 2:
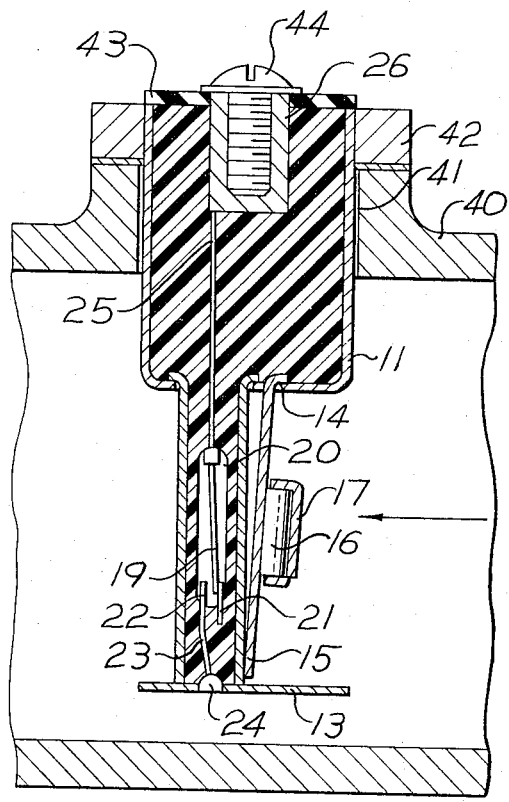
FIG. 2 is a cross-sectional view of the device of FIG. 1 showing the invention installed in a conduit shown in section.
Figure 3:
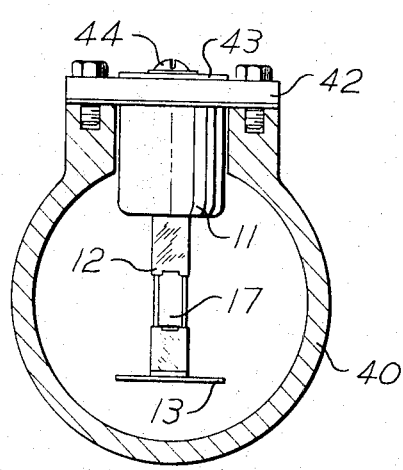
FIG. 3 is an end elevation of the invention on a reduced scale showing the fluid conduit in cross-section.

The device consists of an upper cylindrical housing portion 11 and a lower cylindrical portion or sheath 12 both of which are fabricated from non-magnetic material. Attached to the underside of the upper portion of the housing, as shown at 14 in FIG. 2, is a flexible fluid flow sensor 15 in the form of a light spring leaf. Attached to the mid-portion of the sensor on the side away from the sheath, is a permanent magnet 16. A pair of metal tabs 17 which may be integral with the sensor, are bent to enclose the magnet shown in phantom lines in FIG. 1.

Midway between the ends of the sheath and hermetically sealed therein is a glass encapsulated magnetically operable reed switch 20 having reed 19 and contacts 21 and 22. The reed and contact 21 are fabricated from magnetically permeable material and contact 22 is fabricated from a non-magnetic material. Contact 22 is connected to lead 23 which is grounded as at 24 to a protective disc 13. The reed is connected via lead 25 to an electrical terminal 26.

The reed is preset to make an electrical connection with contact 22 when the sensor is approximately parallel to the axis of the sheath as when there is no fluid flow or when there is a flow below a predetermined critical rate. When the flow of fluid through conduit 40, and in the direction of the arrow in FIG. 2, is above the predetermined critical rate, the sensor assumes the position illustrated in FIG. 2. In this position the magnetic attraction of the permanent magnet is sufficient to break the electrical connection with contact 22 and to urge the reed to assume a position against contact 21 as shown in FIG. 2.

Figure 4:
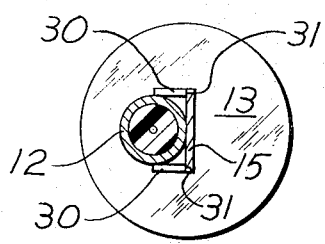
FIG. 4 is a cross-section taken on the line IV—IV of FIG. 1.

As best shown in FIG. 4, affixed to the top of protective disc 13 on either side of the sheath is a pair of triangular tabs 30. The end faces 31 of the tabs are aligned so as to be tangent to the outer circumference of the sheath. When the sensor is forced by the fluid flow to assume the position in FIG. 2, the lower portion of the sensor will touch the outer circumference of the sheath and the lower edges of the sensor will abut end faces 31 of the triangular tabs. These tabs prevent the sensor from rocking about the arcuate surface of the sheath when under the influence of the fluid flow. This avoids unnecessary flexing of the sensor and reduces the possibility that the sensor might fail from metal fatigue.

The use of the protective disc 13 is also a precautionary measure to prevent damage to the sensor as the flow sensing device is being lowered through opening 41 and installed in the conduit.

The interior of the upper portion of the housing and sheath is filled with an epoxy resin providing a hermetically sealed structure thereby preventing the entrance of air, water or foreign matter into the housing. An annular flange 42 is cemented to the top part of the housing and an insulating fiber washer 43 is cemented to the top of the housing. A screw and washer assembly 44 is provided to facilitate an electrical connection with a source of electrical power, not shown, and terminal 26.

While there are numerous ways in which the present device may be employed, one method is to connect an indicator light between a source of electrical power and assembly 44. When there is no fluid flow or when the rate of flow is below a predetermined critical value, the reed will remain in its preset condition and the indicator light circuit will be completed through ground to warn the engine operator of the existing dangerous condition.

The present invention is operated with a minimum of parts and without the use of journalled pivot points. Thus the flow sensing device of the present invention is relatively more sensitive. Problems of friction and wear at the journals are eliminated. The size and flexibility of the sensor may be varied to obtain the desired sensitivity.

We claim:
1. A sensing device for sensing fluid flow in a conduit and for actuating electrical fluid flow monitoring apparatus associated with the device, the device comprising in combination a housing having a first cylindrical portion extending from outside to inside the conduit and a second narrow elongated cylindrical portion disposed in the fluid stream within the conduit; magnetically operable reed switch means hermetically enclosed within the second portion of the housing at a location approximately midway the length of the second portion; a flexible flow sensing means consisting of a light, flexible, narrow spring leaf, of substantially equal length with the second portion, hingedly depending from the first portion of the housing at a short predetermined distance from the outer circumference of the second portion, the longitudinal axis of the spring leaf being substantially parallel to the longitudinal axis of the second portion of the housing at fluid standstill conditions; a permanent magnet disposed on the spring leaf approximately midway the length of the spring leaf but on the side of the spring leaf farther from the switch means such that a rate of fluid flow above a predetermined value urges the magnet toward the switch means to actuate the switch.

2. The device of claim 1 wherein the spring leaf is slightly shorter in length than the second portion of the housing, and further comprising a planar element of a maximum dimension equal to or slightly less than the outer diameter of the first portion of the housing, secured at right angles to the bottom of the second portion of the housing, and having a pair of tabs affixed to the planar element at a location substantially parallel to each other, the longitudinal axis of each tab being substantially normal to the face of the spring leaf, the corresponding ends of each tab being in abutting relation to the face of the lower end of the spring leaf when the spring leaf is urged against the second portion of the housing.

References Cited

UNITED STATES PATENTS

| | | | |
|---|---|---|---|
| 2,600,011 | 6/1952 | MacDonald et al. | 200—81.9 |
| 3,113,189 | 12/1963 | Porwancher | 200—81.9 |
| 3,260,820 | 7/1966 | O'Brien | 200—81.9 |

BERNARD A. GILHEANY, *Primary Examiner.*

H. BROOME, *Assistant Examiner.*